United States Patent
Rambo

(10) Patent No.: US 12,258,907 B2
(45) Date of Patent: Mar. 25, 2025

(54) VEHICLE AND PROPULSION SYSTEM WITH HYDROGEN FUEL SYSTEM

(71) Applicant: General Electric Company, Schenectady, NY (US)

(72) Inventor: Jeffrey Douglas Rambo, Mason, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/439,834

(22) Filed: Feb. 13, 2024

(65) Prior Publication Data
US 2024/0183312 A1 Jun. 6, 2024

Related U.S. Application Data

(62) Division of application No. 17/163,661, filed on Feb. 1, 2021, now abandoned.

(51) Int. Cl.
*F02C 7/18* (2006.01)
*F02C 6/08* (2006.01)
*F02C 3/22* (2006.01)

(52) U.S. Cl.
CPC ............... *F02C 7/185* (2013.01); *F02C 6/08* (2013.01); *F02C 3/22* (2013.01)

(58) Field of Classification Search
CPC .................... F02C 6/08; F02C 7/185
See application file for complete search history.

(56) References Cited

U.S. PATENT DOCUMENTS

| | | | |
|---|---|---|---|
| 2,986,003 A | 5/1961 | Buckingham |
| 3,565,201 A | 2/1971 | Petsinger |
| 4,041,697 A | 8/1977 | Coffinberry et al. |
| 5,159,808 A | 11/1992 | Kast |
| 5,414,992 A | 5/1995 | Glickstein |
| 5,667,051 A | 9/1997 | Goldberg et al. |
| 6,182,435 B1 | 2/2001 | Niggemann et al. |
| 6,461,147 B1 | 10/2002 | Sonju et al. |
| 8,056,344 B2 | 11/2011 | Remy et al. |

(Continued)

FOREIGN PATENT DOCUMENTS

| | | |
|---|---|---|
| CN | 108750123 B | 10/2020 |
| EP | 2527252 A2 | 11/2012 |

(Continued)

*Primary Examiner* — Lorne E Meade
(74) *Attorney, Agent, or Firm* — Dority & Manning, P.A.

(57) ABSTRACT

An aircraft propulsion system in includes a compressor section, a heat addition system, and an expansion section in serial flow arrangement, wherein the heat addition system is configured to receive a flow of gaseous fuel from a fuel system, and wherein the flow of gaseous fuel is provided to the heat addition system to generate combustion gases. A lubricant system is configured to provide a flow of lubricant through the propulsion system. A hydraulic system is configured to provide a flow of hydraulic fluid to an actuator at the propulsion system. A thermal management system is configured to provide a flow of fluid in thermal communication with the lubricant system and the hydraulic system. The thermal management system comprises a turbine configured to receive the flow of fluid via a fluid circuit extended in fluid communication from the compressor section.

11 Claims, 3 Drawing Sheets

(56) References Cited

U.S. PATENT DOCUMENTS

| | | | |
|---|---|---|---|
| 8,215,589 B2 | 7/2012 | Janeke | |
| 8,789,376 B2* | 7/2014 | Coffinberry | F02C 7/22 |
| | | | 60/785 |
| 10,364,750 B2 | 7/2019 | Rambo | |
| 2012/0297789 A1* | 11/2012 | Coffinberry | B64D 37/34 |
| | | | 60/39.83 |
| 2014/0182264 A1 | 7/2014 | Weisgerber et al. | |
| 2019/0218971 A1 | 7/2019 | Niergarth et al. | |
| 2020/0088098 A1 | 3/2020 | Roberge | |
| 2020/0332714 A1 | 10/2020 | Ribarov | |

FOREIGN PATENT DOCUMENTS

| | | |
|---|---|---|
| EP | 3054127 A1 | 8/2016 |
| EP | 3623604 A1 | 3/2020 |
| EP | 3726027 A1 | 10/2020 |
| WO | WO2012/045034 A2 | 4/2012 |

* cited by examiner

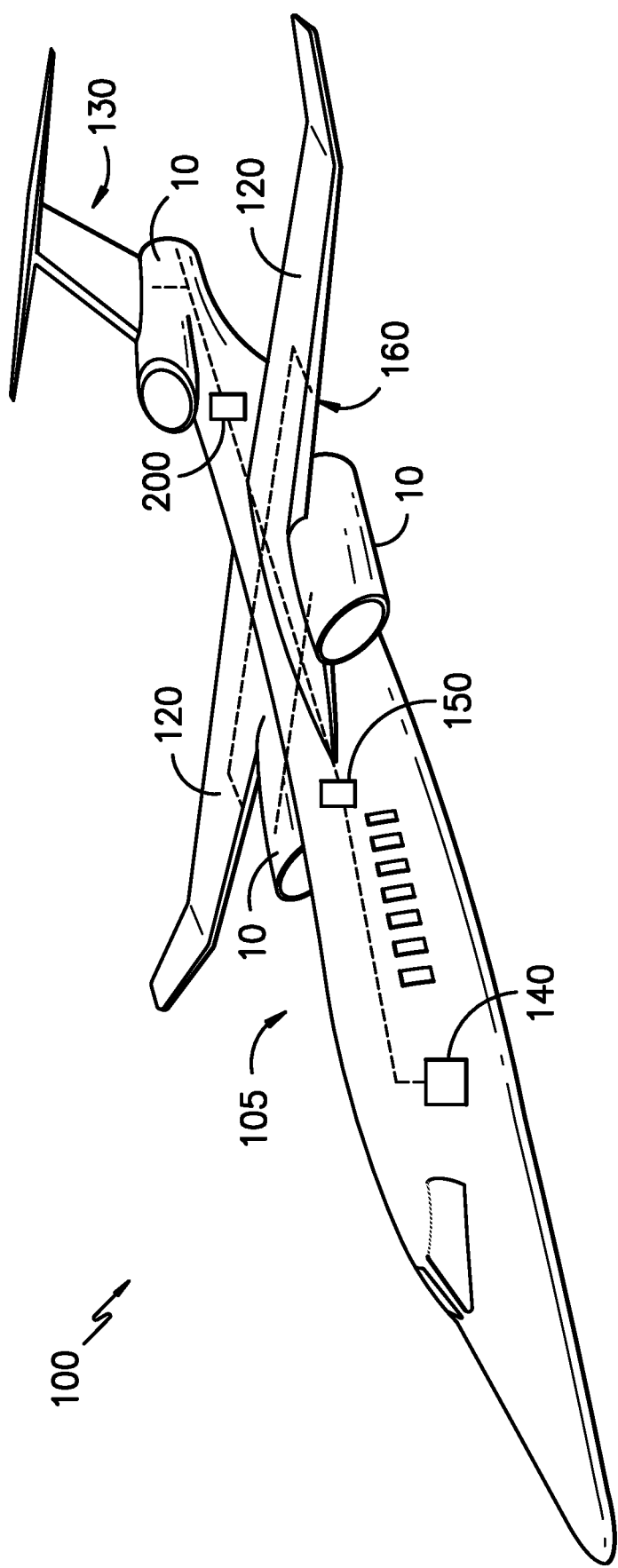
FIG. -1-

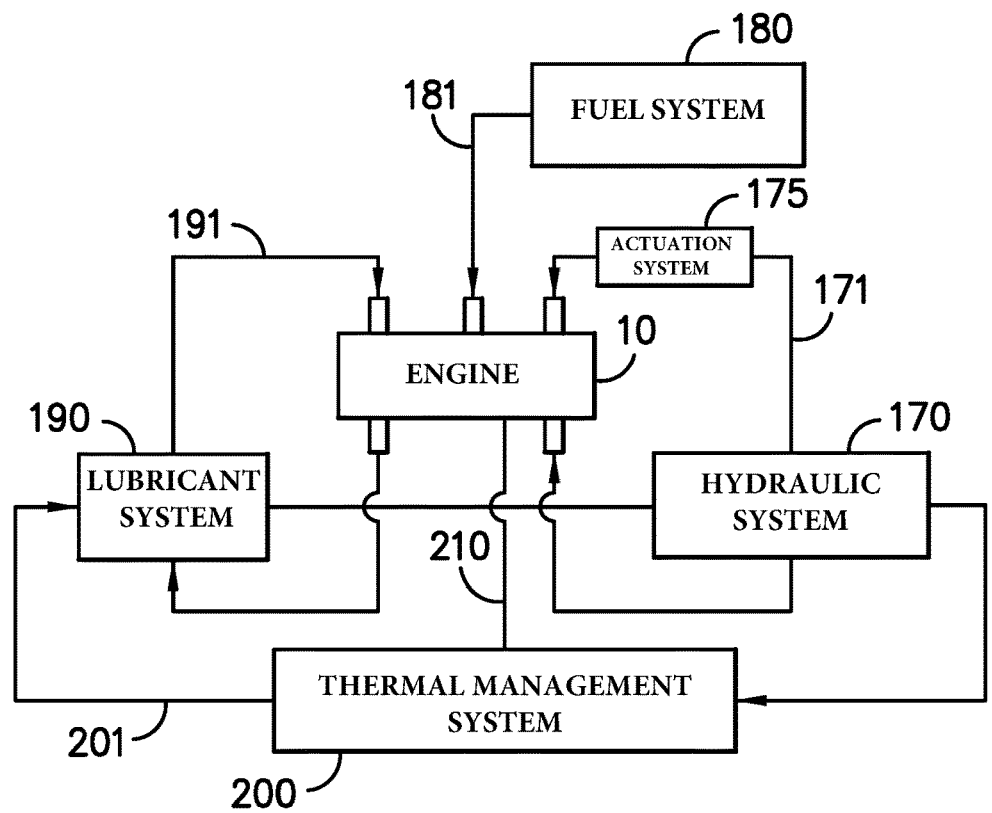
FIG. -2-
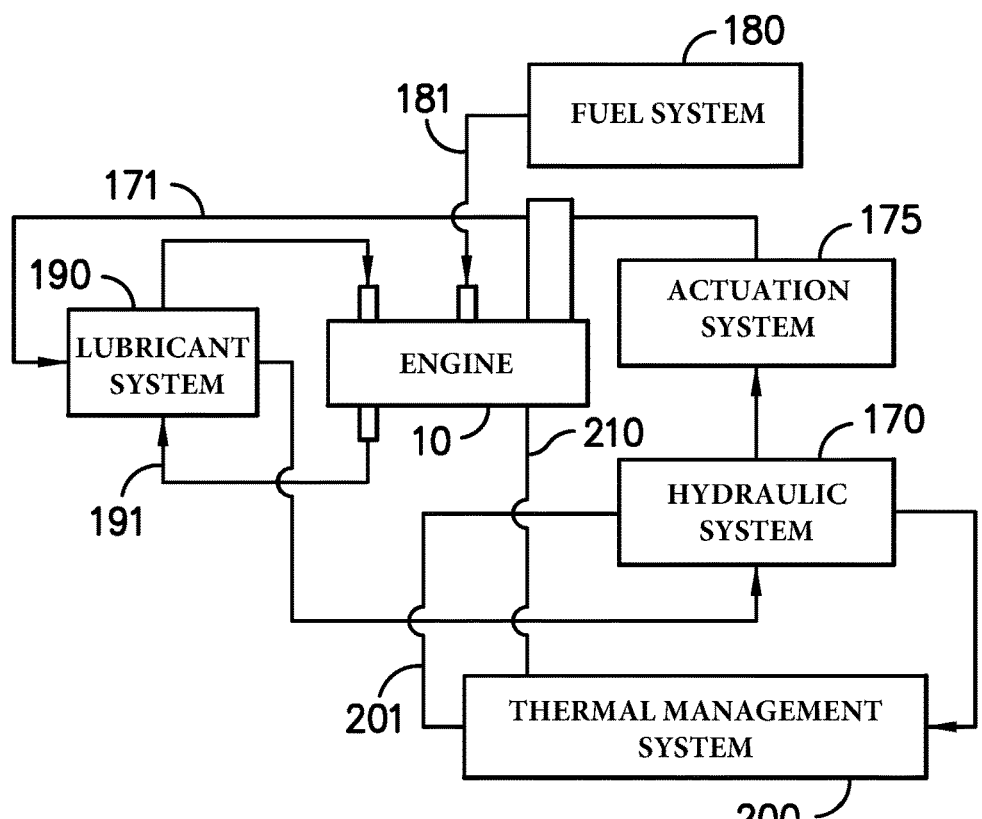
FIG. -3-

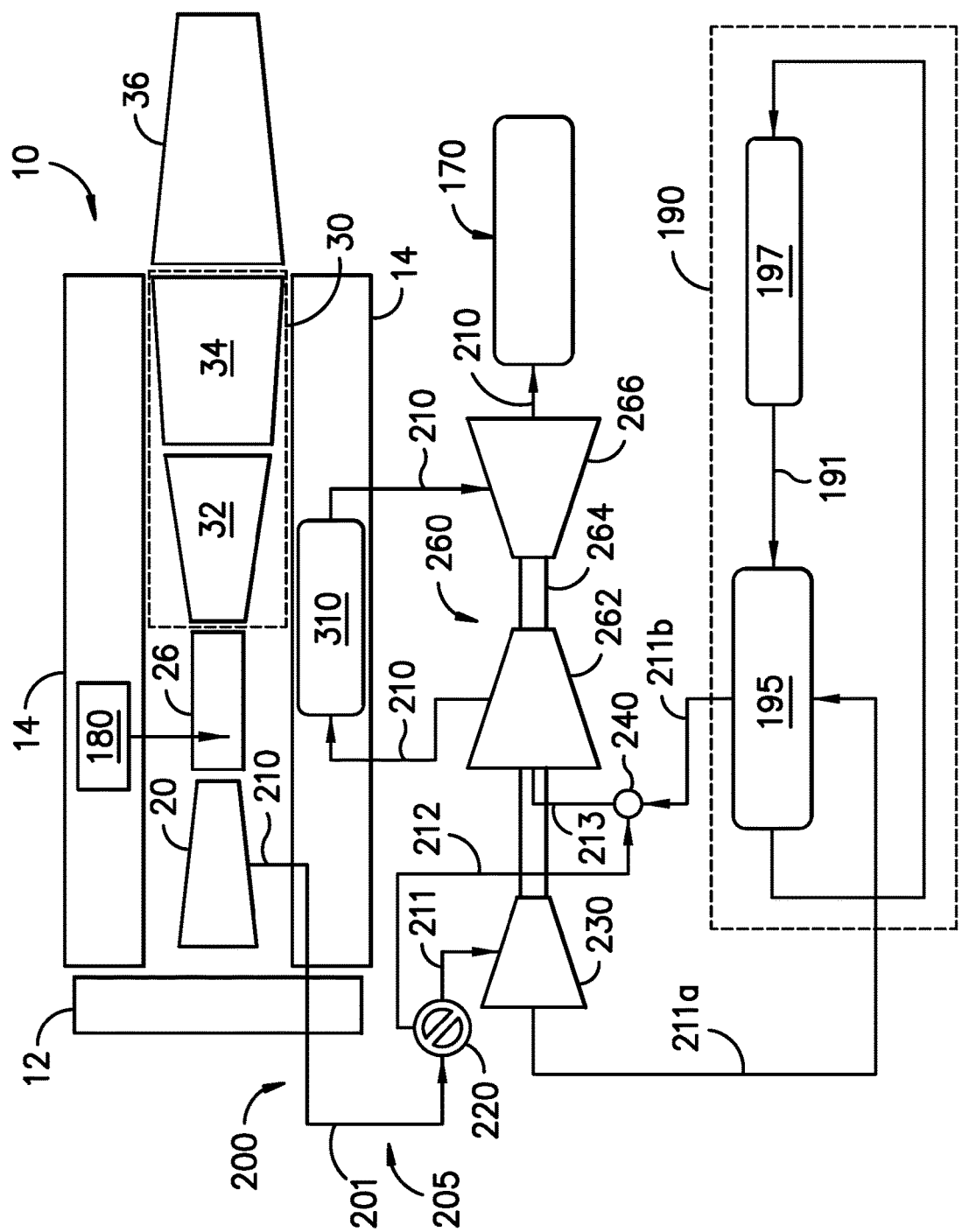
FIG. -4-

VEHICLE AND PROPULSION SYSTEM WITH HYDROGEN FUEL SYSTEM

CROSS-REFERENCE TO RELATED APPLICATIONS

This application is a divisional application of U.S. application Ser. No. 17/163,661 filed Feb. 1, 2021, which is hereby incorporated by reference in its entirety.

FIELD

The present subject matter relates generally to methods and systems for actuation and thermal management for propulsion systems including gaseous fuel systems.

BACKGROUND

Propulsion systems, such gas turbine engines, are challenged with improving operating efficiency, lowering emissions, and improving thermal management of increasingly higher thermal loads. The increasingly higher thermal loads are due to desired improvements to heat transfer between various fluids. The higher thermal loads may further be due to increasing electrification of propulsion systems and vehicles such as aircraft, greater electric loads, and the need for improved thermal efficiency at fuel systems, oil systems, and cooling fluids.

Improvements or changes to certain subsystems of a propulsion system may adversely affect other subsystems. While certain fuels may improve emissions or combustion efficiency, such fuels may adversely affect secondary fuel uses, such as heat transfer, actuation, and overall thermal management. Conventional configurations may be inadequate to attenuate thermal loads related to reduction gearboxes, variable pitch fans, increased electrification, third-stream bypass engines, or alternative fuels.

BRIEF DESCRIPTION

Aspects and advantages of the invention will be set forth in part in the following description, or may be obvious from the description, or may be learned through practice of the invention.

An aspect of the present disclosure is directed to a vehicle and propulsion system. The propulsion system includes a compressor section, a heat addition system, and an expansion section in serial flow arrangement. A fuel system is configured to provide a flow of gaseous fuel to the heat addition system to generate combustion gases. A thermal management system configured to receive a flow of air from the propulsion system. A lubricant system is configured to provide a flow of lubricant to the propulsion system. A hydraulic system is configured to provide a flow of hydraulic fluid to the propulsion system. The thermal management system provides the flow of air in thermal communication with the lubricant system and the hydraulic system.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is an exemplary embodiment of a vehicle including a propulsion system and thermal management system according to aspects of the present disclosure;

FIGS. 2-3 are schematic embodiments of the propulsion system with thermal management system according to aspects of the present disclosure; and FIG. 4 are schematic embodiments of the propulsion system and thermal management system according to aspects of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of a propulsion system and vehicle are provided herein that may improve overall system and vehicle efficiency, improve emissions output, and improve thermal management. The systems provided herein include a combustion section having a gaseous fuel system, a hydraulic system, and a thermal management system in thermal communication with the hydraulic system and lubricant system. The gaseous fuel system may improve emissions output and combustion efficiency, and the hydraulic system allows for actuation and heat transfer. The thermal management system allows for improved heat transfer or thermal attenuation at the lubricant system and hydraulic system without requiring use of a liquid fuel as a heat transfer fluid.

Certain embodiments of the thermal management system and method for operation include utilizing a relatively high pressure fluid from a compressor section of the propulsion system rather than utilizing a pressure regulator or releasing fluid to e.g., an atmospheric condition. As such, work extracted from air removed from the propulsion system may be maximized. Embodiments provided herein may further improve heat transfer from lubricant in a lubricant system. Still further, embodiments provided herein may improve heat transfer from lubricant and additionally from one or more load devices, such as computing systems, environmental control systems, avionics systems, or electric machines. Additionally, or alternatively, cooling fluid at the fluid circuit may be independently adjustable relative to operating condition at the propulsion system, such as via the flow control device and/or the flow device. Embodiments provided herein may include particular serial or parallel flows and components to advantageously improve heat transfer and overall system efficiency. Certain embodiments may allow for substantially independent adjustability of the heat exchange fluid relative to propulsion system operating condition, a lubricant system operating condition, or a load system operating condition.

Referring now to the drawings, in FIG. 1, an exemplary embodiment of a vehicle 100 including a propulsion system 10 and a thermal management system 200 according to aspects of the present disclosure is provided. In an embodiment, the vehicle 100 is an aircraft including an aircraft structure or airframe 105. The airframe 105 includes a fuselage 110 to which wings 120 and an empennage 130 are attached. The propulsion system 10 according to aspects of the present disclosure is attached to one or more portions of the airframe. In various embodiments, the thermal management system 200 is a system configured to desirably distribute thermal loads, such as to add or remove heat from one or more fluids or structures, such as, but not limited to, oxidizer at the propulsion system, fuel, lubricant, hydraulic fluid, pneumatic fluid, or cooling fluid for an electric machine, electronics, computing system, environmental control system, gear assembly, or other system or structure.

In certain instances, the propulsion system 10 is attached to an aft portion of the fuselage 110. In certain other instances, the propulsion system 10 is attached underneath, above, or through the wing 120 and/or portion of the empennage 130. In various embodiments, the propulsion system 10 is attached to the airframe 105 via a pylon or other mounting structure. In still other embodiments, the propulsion system 10 is housed within the airframe, such as may be exemplified in certain supersonic military or commercial aircraft.

Various embodiments of the vehicle 100 include a computing system 140, such as avionics or other electronics or computing devices configured to control the vehicle 100 or the propulsion system 10. The vehicle 100 may further include an environmental control system (ECS) 150, such as to provide thermally conditioned air to a cabin of the vehicle, the computing system 140, a vehicle surface anti-icing system 160, a propulsion system anti-icing system, or other system of the vehicle 100 or propulsion system 10. In various embodiments such as described herein, the thermal management system 200 may be configured to provide thermally conditioned fluid to one or more of the systems described herein.

Referring now to FIGS. 2-3, schematic embodiments of the propulsion system 10 with the thermal management system 200 in accordance with aspects of the present disclosure is provided. In various embodiments, the propulsion system 10 includes a fuel system 180 configured to provide a flow of gaseous to the heat addition system 26, depicted schematically via lines 181. The gaseous fuel 181 provided to the heat addition system 26 is a gaseous fuel, such as hydrogen gas ($H_2$), natural gas, methane, synthesis gas, or other appropriate type of gaseous fuel. In a particular embodiment, the fuel system 180 is configured to provide the flow of fuel 181 as a gaseous fuel at the heat addition system 26.

It should be appreciated that the gaseous fuel has a fuel ignition temperature less than that of a liquid jet fuel ignition temperature. The gaseous fuel further has a fuel burning velocity greater than that of a liquid jet fuel burning velocity. The gaseous fuel has an upper flammability limit greater than liquid jet fuel. Additionally, the range of the flammability limit of gaseous fuel is generally greater than that of liquid jet fuel. In certain embodiments, the lower flammability limit of the gaseous fuel is lower than the upper flammability limit of liquid jet fuel. Still further, the gaseous fuel has a higher flammability than liquid jet fuel. Altogether, the propulsion system 10 configured to generate combustion gases via gaseous fuel rather than liquid kerosene-type or naphtha-type jet fuels allows for improved thermal efficiency, reduced fuel consumption, and decreased emissions.

However, unlike liquid kerosene-based jet fuels or naphtha-type jet fuels, gaseous fuels such as hydrogen gas ($H_2$) are generally unsuitable for secondary functions at a propulsion system, such as providing thermal management for lubricants or hydraulic fluids, or acting as a heat sink fluid or an actuation fluid. Referring to FIGS. 2-3, exemplary schematic embodiments of the propulsion system 10 and vehicle 100 including a fuel system 180, a lubricant system 190, and hydraulic system 170 is provided.

Referring to FIGS. 2-3, the vehicle 100 and propulsion system 10 include the fuel system 180 configured to provide a flow of gaseous fuel, depicted schematically via arrows 181, to the propulsion system 10, such as further described below. In a particular embodiment, the fuel system 180 is configured to direct the flow of gaseous fuel directly to the heat addition system 26 (FIG. 4) of the propulsion system 10. The heat addition system 26 may be configured as a deflagrative combustion system or a detonative combustion system. The heat addition system 26 may include any suitable type of system for receiving a flow of gaseous fuel and generating hot gases, including, but not limited to, annular, can-annular, can, trapped vortex, volute or scroll, rotating detonation, pulse detonation, subsonic or supersonic combustion systems. In various embodiments, the propulsion system 10 is configured to allow a flow of fluid 210, such as compressed air from the compressor section, to the thermal management system 200 as a heat transfer fluid or to thermally condition a heat transfer fluid, lubricant, or hydraulic fluid, such as described herein.

In a particular embodiment such as depicted in FIG. 2, the thermal management system 200 is configured to provide a heat transfer fluid, depicted schematically via arrows 201, in serial thermal communication with a flow of lubricant (depicted schematically via arrows 191) and a hydraulic fluid (depicted schematically via arrows 171. The lubricant system 190 forms an air-lubricant heat exchanger configured to place the flow of lubricant 191 in thermal communication with the flow of fluid 201 from the thermal management system 200. Particularly, the lubricant system 190 is configured to discharge heat or thermal energy from the lubricant 191 to the air 201.

The hydraulic system 170 forms an air-fluid heat exchanger configured to place the flow of hydraulic fluid 171 in thermal communication with the flow of fluid 201 downstream of the lubricant system 190. Particularly, the hydraulic system 170 is configured to discharge heat or thermal energy from the hydraulic fluid 171 to the air 201. In certain embodiments, the flow of fluid 201 is discharged to the propulsion system 10, such as to a turbine section or exhaust section. In other embodiments, the flow of fluid 201 is discharged to atmosphere.

In another embodiment such as depicted in FIG. 3, the hydraulic system 170 is configured to provide the hydraulic fluid 171 as a heat sink configured to receive heat or thermal energy from the flow of lubricant 191 at the lubricant system 190. The thermal management system 200 is configured to receive heat or thermal energy from the flow of hydraulic fluid 171 downstream of the lubricant system 190. The cooled hydraulic fluid 171 is provided from thermal communication with the thermal management system 200 to a hydraulic actuation system 175.

It should be appreciated that the hydraulic actuation system 175 is any number of actuators for the propulsion system 10, including, but not limited to, exhaust nozzle actuators, variable area nozzles, bleed doors, variable vanes, transient or start bleed valves, fan air valves, active clearance control (ACC) valves or actuators, environmental control system (ECS) valves or actuators, or other appropriate articulatable structures of the propulsion system 10. In still other embodiments, the actuation system 175 is any number of actuators for the vehicle 100, including, but not limited to, ailerons, flaps, spoilers, rudders, slats, stabilizers, or other appropriate articulatable structures of the vehicle 100.

Embodiments of the systems provided in FIGS. 2-3 allow for heat rejection from the hydraulic fluid 171 to a cooled flow of fluid 201 from the thermal management system 200, in contrast to fuel-cooled systems. Embodiments provided herein may allow for the gaseous fuel system 180 to provide gaseous fuel 181 to the heat addition system of the propulsion system 10.

Referring now to FIG. 4 exemplary schematic embodiments of the propulsion system 10 and thermal management system 200 for the vehicle 100 (FIG. 1) are provided. Particular embodiments of the propulsion system 10 may be configured as a turbomachine, a ramjet engine, or a scramjet engine. Still particular embodiments of the propulsion system 10 may include a turbomachine configured as a turbofan, turboprop, turbojet, turboshaft, propfan, or open rotor engine. Certain embodiments of the propulsion system 10 include a fan section 12, a compressor section 20, a heat addition or combustion section 26, an expansion section 30, and an exhaust section 36 in serial flow arrangement. The fan section 12 includes one or more stages of rotors and blades. One or more fan streams 14 is positioned downstream of one or more stages of the rotors and blades. In certain embodiments, the fan stream 14 is positioned aft of a first stage fan rotor, such as generally defining a fan bypass of a turbofan engine. In still certain embodiments, one or more fan streams 14 is positioned aft of a second or more stage fan rotor (e.g., a low pressure compressor or booster), such as generally defining a third stream aerodynamically between the fan stream defining a fan bypass and a primary or core flowpath through the compressor section 20, heat addition system 26, and expansion section 30.

It should be appreciated that the third stream flowpath is an air stream configured to recover fluid energy to produce a portion of total thrust of the propulsion system. In one embodiment, the portion of total thrust produced through the third stream flowpath may include a dedicated exhaust nozzle at an outlet end. In another embodiment, the portion of total thrust produced through the third stream flowpath may be mixed with the fan bypass stream. In still another embodiment, the portion of total thrust produced through the third stream flowpath may be mixed with the core flowpath downstream of the heat addition system, and egressed through the exhaust section. Various embodiments of the third stream flowpath are configured to generate less than 50% of the total thrust of the propulsion system.

The compressor section 20, the heat addition system 26, and the expansion section 30 are generally positioned in serial aerodynamic flow arrangement. The compressor section 20, the heat addition system 26, and the expansion section 30 may together define a core engine or gas generator of the propulsion system 10. In certain embodiments, such as described herein, the compressor section 20 includes a high pressure compressor positioned in direct serial flow arrangement with the heat addition system 26 and a high pressure turbine 32 of the expansion section 30. A low pressure turbine 34 of the expansion section 30 may be operably coupled to the fan section 12 to drive the one or more stages of the fan section 12. In certain embodiments not depicted, the propulsion system 10 may include an intermediate pressure compressor positioned aerodynamically between the fan section 12 and the high pressure compressor, an intermediate press turbine positioned aerodynamically between the high pressure turbine 32 and the low pressure turbine 34.

Referring still to FIG. 4, the thermal management system 200 includes walled conduits 205, such as pipes, manifolds, or other appropriate structures, forming a fluid circuit 210 configured in fluid communication to receive air 201 from the compressor section 20 of the propulsion system 10. In certain embodiments, the air 201 is extracted from the core flowpath of the propulsion system 10. In a particular embodiment, the air is extracted from one or more stages at or aft of a high pressure compressor of the compressor section 20.

The thermal management system 200 further includes a flow control device 220 positioned at the fluid circuit 210 downstream of the compressor section 20. A turbine 230 is positioned at the fluid circuit 210 downstream of the compressor section 20. In particular embodiments, the flow control device 220 and the turbine 230 are integrated as a variable area turbine nozzle (VATN). The flow control device 220 and the turbine 230 together defining the VATN are together configured to control mass flow into or through the turbine 230. In one embodiment, the flow control device 220 is a variable area structure, such as a variable area nozzle, at an inlet of the turbine 230. However, in other embodiments, the flow control device 220 is a separate flow control structure configured to adjust mass flow through the turbine 230. In certain embodiments, the turbine 230 is downstream of the flow control device 220.

In certain embodiments, a flow device 240 is positioned at the fluid circuit 210 downstream of the flow control device 220 and the turbine 230. The flow control device 220 is configured to provide a first portion 211 of fluid to the turbine 230 in parallel with a second portion 212 of fluid provided from the flow control device 220 to the flow device 240. The flow device 240 is configured to combine, mix, or draw together the flows from the first portion 21 and the second portion 212. In various embodiments, the flow device 240 is a fluid mixer, ejector, or other appropriate device configured to allow the relatively higher-pressure stream of fluid at the second portion 212 to draw the relatively lower-pressure stream from first portion 211 together through the fluid circuit 210 as the combined flow of fluid depicted schematically at 213. The fluid circuit 210 is configured to provide the first portion 211 of fluid from the turbine 230 to the flow device 240. A thermal load, such as the lubricant system 190, is positioned in thermal communication with the fluid circuit 210 downstream of the turbine 230.

In various embodiments, the flow control device 220 is a diverter valve or other appropriate mechanism configured to direct ratios or proportions of the first portion 211 and the second portion 212 to the turbine 230 and the flow device 240, respectively. The pressurized flow of fluid from the compressor section 20 is utilized to drive the turbine 230, such as depicted at first portion 211. In certain embodiments, such as depicted in FIG. 4, the expanded, decreased-pressure fluid, depicted schematically at 211a, is then routed along the fluid circuit 210 from the turbine 230 to the flow device 240. In still certain embodiments, the expanded, decreased-pressure fluid 211a is routed along the fluid circuit 210 from the turbine 230 to thermal communication with the lubricant system 190. After thermal communication with the lubricant system 190, the fluid, depicted schematically via arrows 211b, may be provided to the flow device 240, such as depicted in FIG. 3. In another embodiment, the fluid 211b may be discharged or dumped, such as to an engine bay, under engine cowl, or to atmosphere, such as depicted in FIG. 5 at 211c. The flow device 240 is configured to receive the first portion 211 of fluid from the flow control device 220 and the second portion 212 of fluid from the turbine 230. In certain embodiments, the flow control device 220 is configured to provide the first portion 211 of fluid to the turbine 230 in parallel with the second portion 212 of fluid to the flow device 240, while the second portion 212 of fluid bypasses the turbine 230.

It should be appreciated that conventional thermal management systems generally utilize a valve to restrict or regulate flow from an engine compressor to an air cycle machine compressor. Such systems typically result in relatively large pressure losses across the valve. Such pressure losses result in substantially inefficiencies for the engine and thermal management systems by compressing the air at the engine compressor then dumping the excessive pressure to control or regulate the flow to the air cycle machine compressor. In contrast, embodiments of the present disclosure utilize the excessive pressure at the turbine 230 to produce useful work, such as provided herein.

The first portion 211 of fluid may generally include a first fluid characteristic different from the second portion 212 of fluid having a second fluid characteristic. In various embodiments, the first fluid characteristic includes a higher pressure or flow rate of the fluid than the second fluid characteristic. The flow device 240 is configured to receive the respective portions 211, 212 of fluid and provide the desired fluid (e.g., having a third fluid characteristic, depicted at fluid 213 of the fluid circuit 210, different from the first and second fluid characteristics of fluid 211 and fluid 212, respectively) downstream along the fluid circuit 210.

Referring to FIG. 4, in various embodiments, the turbine 230 is operably coupled to a turbomachine 260 positioned at the fluid circuit 210. The turbomachine 260 includes a compressor 262 coupled by a driveshaft 264 with a turbine 266. In a particular embodiment, the turbomachine 260 is part of an air cycle system. The compressor 262 is positioned at the fluid circuit 210 downstream of the flow device 240. In a particular embodiment, the turbine 230 is operably coupled to the driveshaft 264 to provide energy to drive the compressor 262. In a still particular embodiment, the turbine 230 and the turbine 266 of the turbomachine 260 together provide energy to drive the compressor 262.

It should be appreciated that the flow control device 220 allows the fluid circuit 210 to selectively modulate a ratio or proportion of the first portion 211 and the second portion 212 to the turbine 230 and the flow device 240, respectively. In contrast to a pressure regulator configured to decrease pressure, resulting in work or energy loss for the propulsion system 10 and the thermal management system 200, the flow control device 220, such as defining a diverter valve or other appropriate device for selectively modulating a proportion of fluid flows to two or more circuits (e.g., first portion 211 and second portion 212), allows the turbine 230 to utilize the relatively high pressure fluid from the compressor section 20 to at least partially drive the turbomachine 260. The turbine 230 may correspond to a desired fluid characteristic (e.g., a desired second fluid characteristic) for the fluid egressing the turbine 230 to the flow device 240. Additionally, or alternatively, the turbine 230 may correspond to a desired energy output to the turbomachine 260 to which the turbine 230 is operably coupled.

Referring now to FIG. 4, in various embodiments, the vehicle 100, propulsion system 10, and thermal management system 200 include a heat exchanger 310 positioned at the fluid circuit 210 downstream of the compressor 262 and upstream of the turbine 266 of the turbomachine 260. In various embodiments, the heat exchanger 310 is positioned in thermal communication with one or more fan streams of the propulsion system 10. As described above, the one or more fan streams may include a fan bypass stream or a third stream positioned between the fan stream and a core flowpath. The heat exchanger 310 is configured to expel thermal energy or heat from the fluid circuit 210. In certain embodiments, the heat exchanger 310 is configured to input thermal energy or heat to a fuel circuit, such as to heat a flow of fuel prior to injecting the fuel at the heat addition or combustion section. In still certain embodiments, the heat exchanger 310 is configured to input thermal energy or heat to a stream of air passing through one or more fan streams 14. In still various embodiments, the heat exchanger 310 includes a fuel circuit positioned in thermal communication with the fluid circuit 210.

Referring now to FIG. 4, in various embodiments, the lubricant system 190 includes a lubricant heat exchanger 195 positioned at the fluid circuit 210 downstream of the turbine 230. In still various embodiments, the lubricant system 190 includes a flow of lubricant 191 positioned in thermal communication with the fluid circuit 210. The lubricant 191 includes oil or oil-based fluid for a bearing assembly 197. The lubricant system 190 may include any appropriate system including pumps, scavenges, and heat exchangers configured to provide lubricant to one or more bearing assemblies, gear assemblies, actuators, or other systems of the propulsion system 10 or vehicle 100. The lubricant 191 is provided in heat exchanger relationship with the fluid circuit 210 at the lubricant heat exchanger 195.

In certain embodiments, the lubricant heat exchanger 195 is configured to receive or remove heat or thermal energy from the lubricant 191 and provide heat or thermal energy to the fluid circuit 210, or particularly the first portion 211 of fluid downstream of the turbine 230. The flow control device 220 may be configured to adjust an amount of the first portion 211 of fluid provided to the turbine 230 and the lubricant system 190 based on a desired heat transfer between the fluid circuit 210 and the lubricant 191.

In particular embodiments, the lubricant system 190 including the bearing assembly 197 is positioned in thermal communication with the fluid circuit 210 downstream of the turbine 230. In still particular embodiments, such as depicted in FIG. 4, the lubricant system 190 is positioned in thermal communication with the fluid circuit 210 downstream of the turbine 230 and upstream of the flow device 240.

In still certain embodiments, the hydraulic system 170 is positioned in thermal communication with the fluid circuit 210 downstream of the turbomachine 260.

A method for thermal management for a vehicle is provided herein. The method may be executed via the aircraft 100, the propulsion system 10 or the thermal management 200 such as depicted and described herein. The method may provide one or more benefits such as described herein with regard to the particular positioning, arrangement, fluid communication, and thermal communication provided in the various embodiments.

The method includes extracting a flow of compressed fluid from a compressor section of a propulsion system, such as described with regard to flow of fluid extracted from the compressor section 20 to the fluid circuit 210. The flow of compressed fluid includes a pressure parameter. The pressure parameter is a measurement, calculation, or signal indicative of the pressure of the compressed fluid. The method further includes generating an output torque via expanding at least a portion of the flow of compressed fluid across a turbine operably connected to a driveshaft, such as described with regard to first portion 211 of the flow of fluid expanded via the turbine 230. The turbine is positioned downstream of the compressor section and upstream of a cooling system, such as described with regard to the turbomachine 260.

In an embodiment, the method includes determining a pressure requirement of the flow of compressed fluid at the cooling system and flowing or otherwise providing the flow of compressed fluid to the cooling system. Referring to FIG. 4, the cooling system, such as the turbomachine 260, is configured to operate from the flow of compressed fluid having the value corresponding to the pressure requirement. In one embodiment, the pressure requirement is a range of pressure at which the cooling system, such as the turbomachine 260, is operable. A minimum pressure may be required for operating the cooling system. A maximum pressure may be required for maintaining desired operability, performance, efficiency, or structural life and durability.

In various embodiments, generating the output torque via expanding at least the portion of the flow of compressed fluid across the turbine includes flowing or otherwise providing, from upstream of the turbine, a first portion of the flow of compressed fluid to the cooling system and providing a second portion of the flow of compressed fluid to the turbine, such as described with regard to the flow control device 220 splitting, diverting, or otherwise apportioning the first portion 211 of fluid to the turbine 230 and providing the second portion 212 of fluid to a flow device 240 such as described herein. In one embodiment, the second portion of the flow of compressed fluid corresponds to the pressure requirement at the cooling system. For instance, referring to FIG. 4, the flow control device 220 may divert the flow of fluid as the second portion 212 having substantially the required pressure for operating the turbomachine 260. In still another embodiment, the first portion of the flow of compressed fluid corresponds to a difference between the pressure requirement at the cooling system and the pressure parameter of the flow of compressed fluid from the compressor section. As such, the first portion 211 of the flow of compressed fluid corresponding to a magnitude of pressure in excess of the pressure requirement may be routed to the turbine 230, and the second portion 212 of the flow of compressed fluid corresponding to a magnitude of pressure required for operating the turbomachine 260 is routed to the turbomachine 260. The method may further include combining the first portion and the second portion of the flow of compressed air, such as described with regard to the flow device 240, and providing the combined flow of compressed air to the cooling system.

In still various embodiments, the method includes generating the output torque via expanding at least the portion of the flow of compressed fluid across the turbine includes converting excess pressure of the flow of compressed fluid from the compressor section into the output torque at the driveshaft, such as described with regard to the thermal management system 200. In an embodiment, converting excess pressure of the flow of compressed fluid corresponds to a difference between a pressure requirement of the flow of compressed fluid at the cooling system and the pressure parameter of the flow of compressed fluid at the compressor section.

In still yet various embodiments, the method includes operating a turbomachine at the cooling system via the output torque from the turbine, such as described with regard to the turbomachine 260 in FIG. 4. In certain embodiments, operating the turbomachine at the cooling system includes flowing or otherwise providing, in serial flow arrangement, the flow of compressed fluid to a compressor at the turbomachine, a heat exchanger positioned downstream of the compressor, and an expander positioned downstream of the compressor. In a particular embodiment, the method includes flowing or otherwise providing the flow of compressed fluid to a thermal load positioned downstream of the expander.

In some embodiments, the method further includes modulating mass flowrate of the flow of compressed fluid to the turbine based at least on a flow control device (e.g., flow control device 220) upstream of the turbine (e.g., turbine 230) and downstream of the compressor section (e.g., compressor section 20 at the propulsion system 10). In an embodiment, modulating mass flowrate of the flow of compressed fluid to the turbine includes flowing or otherwise providing, from the flow control device, a first portion of the flow of compressed fluid to the turbine then expanding the second portion of the flow of compressed fluid across the turbine, and providing, from the flow control device, a second portion of the flow of compressed fluid to the cooling system, such as described with regard to FIG. 4. In still various embodiments, modulating mass flowrate of the flow of compressed fluid to the turbine includes flowing or otherwise providing, from the flow control device, a first portion of the flow of compressed fluid to the turbine, in which the first portion of the flow of compressed fluid corresponds to a difference between the pressure requirement at the cooling system and the pressure parameter of the flow of compressed fluid from the compressor section, and flowing or otherwise providing, from the flow control device, a second portion of the flow of compressed fluid to the cooling system, wherein the second portion of the flow of compressed fluid corresponds to a pressure requirement at the cooling system. In a particular embodiment, modulating mass flowrate of the flow of compressed fluid to the turbine includes adjusting an area of a variable area turbine nozzle of the turbine.

In various embodiments, extracting the flow of compressed fluid from the compressor section of the propulsion system includes extracting the flow of compressed fluid from two or more stations at the compressor section. Each station provides a respective pressure parameter different from one another. In one embodiment, the method includes modulating from which station at the compressor section the flow of compressed fluid is extracted. Modulating from which station at the compressor section the flow of compressed fluid is extracted may be based at least on a pressure requirement at the cooling system and an operating mode of the propulsion system.

Embodiments of the propulsion system 10, vehicle 100, and thermal management system 200 provided herein may improve system efficiency, such as through utilizing the pressure of the fluid from the compressor section of the propulsion system, or particularly from a high pressure compressor, rather than utilizing a pressure regulator or releasing fluid to e.g., an atmospheric condition. Embodiments provided herein may further improve heat transfer from lubricant at a lubricant system. Still further, embodiments provided herein may improve heat transfer from lubricant and additionally from one or more load devices, such as the load heat exchanger. Additionally, or alternatively, cooling fluid at the fluid circuit 210 may be independently adjustable relative to operating condition at the propulsion system 10, such as via the flow control device 220 and/or the flow device 240.

One or more components of the propulsion system 10 and thermal management system 200 described herein may be manufactured or formed using any suitable process, such as an additive manufacturing process, such as a 3-D printing process. The use of such a process may allow such components to be formed integrally, as a single monolithic component, or as any suitable number of sub-components, or at scales and intricacies not previously allowed or conceived in the art. In particular, the additive manufacturing process may allow such component to be integrally formed and include a variety of features not possible when using prior manufacturing methods. For example, the additive manufacturing methods described herein may allow for the manufacture of the turbine 230 and the flow control device 220 as a single, integral component. In further embodiments, the additive manufacturing methods described herein allow for the manufacture of the turbine 230, the flow control device 220, and at least a portion of the conduit 205 having unique features, configurations, thicknesses, materials, densities, fluid passageways, headers, and mounting structures that may not have been possible or practical using prior manufacturing methods.

Suitable additive manufacturing techniques in accordance with the present disclosure include, for example, Fused Deposition Modeling (FDM), Selective Laser Sintering (SLS), 3D printing such as by inkjets, laser jets, and binder jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes. Suitable powder materials for the manufacture of the structures provided herein as integral, unitary, structures, or at scales and intricacies provided herein, include metallic alloy, polymer, or ceramic powders. Exemplary metallic powder materials are stainless steel alloys, cobalt-chrome, aluminum alloys, titanium alloys, nickel based superalloys, and cobalt based superalloys. In addition, suitable alloys may include those that have been engineered to have good oxidation resistance, known as "superalloys" which have acceptable strength at the elevated temperatures of operation in a gas turbine engine, e.g. Hastelloy, Inconel alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-850, ECY 768, 282, X45, PWA 1483 and CMSX (e.g. CMSX-4) single crystal alloys. The manufactured objects of the present disclosure may be formed with one or more selected crystalline microstructures, such as directionally solidified ("DS") or single-crystal ("SX").

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A method for thermal management for a vehicle, the method including extracting a flow of compressed fluid from a compressor section of a propulsion system, wherein the flow of compressed fluid comprises a pressure parameter; and generating an output torque via expanding at least a portion of the flow of compressed fluid across a turbine operably connected to a driveshaft, wherein the turbine is positioned downstream of the compressor section and upstream of a cooling system.

2. The method of any one or more clauses herein, the method including determining a pressure requirement of the flow of compressed fluid at the cooling system; and providing the flow of compressed fluid to the cooling system, wherein the flow of compressed fluid comprises the pressure requirement.

3. The method of any one or more clauses herein, wherein generating the output torque via expanding at least the portion of the flow of compressed fluid across the turbine includes providing a first portion of the flow of compressed fluid to the turbine; and providing, from upstream of the turbine, a second portion of the flow of compressed fluid to the cooling system.

4. The method of any one or more clauses herein, wherein the second portion of the flow of compressed fluid corresponds to a pressure requirement at the cooling system.

5. The method of any one or more clauses herein, wherein the first portion of the flow of compressed fluid corresponds to a difference between the pressure requirement at the cooling system and the pressure parameter of the flow of compressed fluid from the compressor section.

6. The method of any one or more clauses herein, the method including combining the first portion and the second portion of the flow of compressed air.

7. The method of any one or more clauses herein, the method including providing the combined flow of compressed air to the cooling system.

8. The method of any one or more clauses herein, wherein generating the output torque via expanding at least the portion of the flow of compressed fluid across the turbine comprises converting excess pressure of the flow of compressed fluid from the compressor section into the output torque at the driveshaft.

9. The method of any one or more clauses herein, wherein converting excess pressure of the flow of compressed fluid corresponds to a difference between a pressure requirement of the flow of compressed fluid at the cooling system and the pressure parameter of the flow of compressed fluid at the compressor section.

10. The method of any one or more clauses herein, the method including operating a turbomachine at the cooling system via the output torque from the turbine.

11. The method of any one or more clauses herein, wherein operating the turbomachine at the cooling system includes providing, in serial flow arrangement, the flow of compressed fluid to a compressor at the turbomachine, a heat exchanger positioned downstream of the compressor, and an expander positioned downstream of the compressor.

12. The method of any one or more clauses herein, the method including providing the flow of compressed fluid to a thermal load positioned downstream of the expander.

13. The method of any one or more clauses herein, the method including modulating mass flowrate of the flow of compressed fluid to the turbine based at least on a flow control device upstream of the turbine and downstream of the compressor section.

14. The method of any one or more clauses herein, wherein modulating mass flowrate of the flow of compressed fluid to the turbine includes providing, from the flow control device, a first portion of the flow of compressed fluid to the turbine then expanding the second portion of the flow of compressed fluid across the turbine; and providing, from the flow control device, a second portion of the flow of compressed fluid to the cooling system.

15. The method of any one or more clauses herein, wherein modulating mass flowrate of the flow of compressed fluid to the turbine includes providing, from the flow control device, a first portion of the flow of compressed fluid to the turbine, wherein the first portion of the flow of compressed fluid corresponds to a difference between the pressure requirement at the cooling system and the pressure parameter of the flow of compressed fluid from the compressor section; and providing, from the flow control device, a second portion of the flow of compressed fluid to the cooling system, wherein the second portion of the flow of compressed fluid corresponds to a pressure requirement at the cooling system.

16. The method of any one or more clauses herein, wherein modulating mass flowrate of the flow of compressed fluid to the turbine comprises adjusting an area of a variable area turbine nozzle of the turbine.

17. The method of any one or more clauses herein, wherein extracting the flow of compressed fluid from the compressor section of the propulsion system comprises extracting the flow of compressed fluid from two or more stations at the compressor section, wherein each station provides a respective pressure parameter different from one another.

18. The method of any one or more clauses herein, the method including modulating from which station at the compressor section the flow of compressed fluid is extracted.

19. The method of any one or more clauses herein, wherein modulating from which station at the compressor section the flow of compressed fluid is extracted is based at least on a pressure requirement at the cooling system and an operating mode of the propulsion system.

20. The method of any one or more clauses herein, the method including providing the flow of compressed fluid to a thermal load downstream of the turbine.

21. A thermal management system for an aircraft, the system configured to execute steps of the method of any clause herein.

22. A thermal management system, the system including a propulsion system having a compressor section and a turbine section in serial flow arrangement; a fluid circuit extended in fluid communication from the compressor section to a flow control device, and wherein a first portion of the fluid circuit is extended in fluid communication from the flow control device to a turbine, and wherein a second portion of the fluid circuit is extended in fluid communication from the flow control device to a flow device, and wherein the fluid circuit configured to receive a flow of fluid from the compressor section of the propulsion system and provide a first portion of the flow of fluid to expand through the turbine, and wherein the flow of fluid expanded through the turbine is provided in thermal communication, via the fluid circuit, with a thermal load, and wherein a second portion of the flow of fluid is provided to the flow device bypassing the turbine.

23. The thermal management system of any clause herein, wherein the fluid circuit is extended in fluid communication with a cooling system downstream of the turbine.

24. The thermal management system of any clause herein, wherein the fluid circuit is extended in fluid communication from the flow device to the cooling system.

25. The thermal management system of any clause herein, wherein the fluid circuit is extended from the cooling system to provide the flow of fluid in thermal communication with the thermal load.

26. The thermal management system of any clause herein, wherein the cooling system is a turbomachine including a turbine operably coupled to a compressor.

27. The thermal management system of any clause herein, wherein the actuator is one or more of an exhaust nozzle actuator, a variable area nozzle, a bleed door, a variable vane, a transient bleed valve, a fan air valve, an active clearance control actuator, or an environmental control system actuator.

28. An aircraft propulsion system, the propulsion system comprising a compressor section, a heat addition system, and an expansion section in serial flow arrangement, wherein the heat addition system is configured to receive a flow of gaseous fuel from a fuel system, and wherein the flow of gaseous fuel is provided to the heat addition system to generate combustion gases; a lubricant system configured to provide a flow of lubricant through the propulsion system; a hydraulic system configured to provide a flow of hydraulic fluid to an actuator at the propulsion system; and a thermal management system configured to provide a flow of fluid in thermal communication with the lubricant system and the hydraulic system.

29. The propulsion system of any clause herein, wherein the lubricant system is positioned in serial thermal communication downstream of the thermal management system.

30. The propulsion system of any clause herein, wherein the hydraulic system is positioned in serial thermal communication downstream of the lubricant system.

31. The propulsion system of any clause herein, wherein the fuel system is configured to provide a direct flow of gaseous fuel to the heat addition system.

32. The propulsion system of any clause herein, wherein the thermal management system comprises a turbine configured to receive the flow of fluid via a fluid circuit extended in fluid communication from the compressor section.

33. The propulsion system of any clause herein, wherein a flow control device is positioned along the fluid circuit upstream of the turbine and downstream of the compressor section.

34. The propulsion system of any clause herein, wherein the flow control device is configured to separate the flow of fluid into a first portion directed to the turbine and a second portion directed to a flow device.
35. The propulsion system of any clause herein, wherein the flow device is configured to receive the first portion of the flow of fluid downstream of the turbine and the lubricant system.
36. The propulsion system of any clause herein, wherein the flow device is configured to receive the second portion of the flow of fluid bypassing the turbine.
37. The propulsion system of any clause herein, wherein the turbine is operably coupled to a turbomachine.
38. The propulsion system of any clause herein, wherein the fluid circuit is extended from the turbomachine downstream to thermal communication with the hydraulic system.
39. A vehicle, the vehicle comprising a propulsion system comprising a compressor section, a heat addition system, and an expansion section in serial flow arrangement; a fuel system configured to provide a flow of gaseous fuel to the heat addition system to generate combustion gases; a thermal management system configured to receive a flow of fluid from the propulsion system; a lubricant system configured to provide a flow of lubricant to the propulsion system; and a hydraulic system configured to provide a flow of hydraulic fluid to an actuator at the propulsion system, wherein the thermal management system provides the flow of fluid in thermal communication with the lubricant system and the hydraulic system.
40. The vehicle of any clause herein, wherein the lubricant system is positioned in serial thermal communication downstream of the thermal management system.
41. The vehicle of any clause herein, wherein the hydraulic system is positioned in serial thermal communication downstream of the lubricant system.
42. The vehicle of any clause herein, wherein the fuel system is configured to provide a direct flow of gaseous fuel to the heat addition system.
43. The vehicle of any clause herein, wherein the fuel system is configured to provide the flow of gaseous fuel as a hydrogen gas to the heat addition system.
44. The vehicle of any clause herein, wherein the thermal management system comprises a turbine configured to receive the flow of air via a fluid circuit extended in fluid communication from the compressor section.
45. The vehicle of any clause herein, wherein a flow control device is positioned along the fluid circuit upstream of the turbine and downstream of the compressor section.
46. The vehicle of any clause herein, wherein the flow control device is configured to separate the flow of air into a first portion directed to the turbine and a second portion directed to a flow device, and wherein the flow device is configured to receive the first portion of the flow of air downstream of the turbine and the lubricant system, and wherein the flow device is configured to receive the second portion of the flow of air bypassing the turbine.
47. The vehicle of any clause herein, wherein the turbine is operably coupled to a turbomachine, and wherein the fluid circuit is extended from the turbomachine downstream to thermal communication with the hydraulic system.
48. The vehicle of any clause herein, wherein the vehicle is an aircraft.
49. An aircraft including the thermal management system of any clause herein.
50. An aircraft configured to execute one or more steps of the method of any one or more clauses herein.

What is claimed is:

1. An aircraft propulsion system, the propulsion system comprising:
   a compressor section, a heat addition system comprising a combustor, and an expansion section in serial flow arrangement, wherein the heat addition system is configured to receive a flow of gaseous fuel, and wherein the flow of gaseous fuel is provided to the heat addition system to generate combustion gases;
   a lubricant line providing a flow of lubricant through the propulsion system;
   a hydraulic fluid line providing a flow of hydraulic fluid to an actuator at the propulsion system; and
   a fluid circuit providing a flow of fluid in thermal communication with the lubricant line and the hydraulic fluid line, wherein the fluid circuit comprises a turbine configured to receive the flow of fluid via the fluid circuit, wherein the fluid circuit is in fluid communication with the compressor section,
   wherein a flow control device is positioned along the fluid circuit upstream of the turbine and downstream of the compressor section, wherein the flow control device is configured to separate the flow of fluid into a first portion directed to the turbine and a second portion directed to a flow device, wherein the flow device is configured to receive the first portion of the flow of fluid downstream of the turbine and the lubricant line.

2. The propulsion system of claim 1, wherein the lubricant line is positioned in serial thermal communication downstream of the thermal management system.

3. The propulsion system of claim 2, wherein the hydraulic fluid line is positioned in serial thermal communication downstream of the lubricant line.

4. The propulsion system of claim 1, wherein the flow device is configured to receive the second portion of the flow of fluid bypassing the turbine.

5. The propulsion system of claim 1, wherein the turbine is operably coupled to a turbomachine.

6. The propulsion system of claim 5, wherein the fluid circuit is extended from the turbomachine downstream to thermal communication with the hydraulic fluid line.

7. A vehicle, the vehicle comprising:
   a propulsion system comprising a compressor section, a heat addition system comprising a combustor, and an expansion section in serial flow arrangement, wherein the heat addition system is configured to receive a flow of gaseous fuel to generate combustion gases;
   a fluid circuit providing a flow of fluid, the fluid circuit being in fluid communication with the compressor section for receiving a flow of air from the compressor section, the flow of fluid comprising the air received by the fluid circuit;
   a lubricant line providing a flow of lubricant to the propulsion system; and
   a hydraulic fluid line providing a flow of hydraulic fluid to an actuator at the propulsion system,
   wherein the fluid circuit provides the flow of fluid in thermal communication with the lubricant line and the hydraulic fluid line,
   wherein a turbine is configured to receive the flow of air via the fluid circuit extended in fluid communication from the compressor section, wherein a flow control device is positioned along the fluid circuit upstream of the turbine and downstream of the compressor section, wherein the flow control device is configured to separate the flow of air into a first portion directed to the turbine and a second portion directed to a flow device, and wherein the flow device is configured to receive the first portion of the flow of air downstream of the turbine and the lubricant line, and wherein the flow device is configured to receive the second portion of the flow of air bypassing the turbine.

8. The vehicle of claim 7, wherein the lubricant line is positioned in serial thermal communication downstream of the fluid circuit.

9. The vehicle of claim 8, wherein the hydraulic fluid line is positioned in serial thermal communication downstream of the lubricant line.

10. The vehicle of claim 7, wherein the flow of gaseous fuel provided to the heat addition system is a flow of hydrogen gas.

11. The vehicle of claim 7, wherein the turbine is operably coupled to a turbomachine, and wherein the fluid circuit is extended from the turbomachine downstream to thermal communication with the hydraulic fluid line.

\* \* \* \* \*